United States Patent
Koo (10) Patent No.: US 8,344,855 B2
(45) Date of Patent: Jan. 1, 2013

(54) RADIO FREQUENCY IDENTIFICATION INTERROGATOR AND METHOD OF OPERATING THE SAME

(75) Inventor: Ji Hun Koo, Seongnam-si (KR)

(73) Assignee: Samsung Electronics Co., Ltd. (KR)

( * ) Notice: Subject to any disclaimer, the term of this patent is extended or adjusted under 35 U.S.C. 154(b) by 420 days.

(21) Appl. No.: 12/658,039

(22) Filed: Feb. 1, 2010

(65) Prior Publication Data

US 2010/0194536 A1    Aug. 5, 2010

(30) Foreign Application Priority Data

Feb. 2, 2009  (KR) ................... 10-2009-0007888

(51) Int. Cl.
*H04Q 5/22* (2006.01)
*H04B 17/00* (2006.01)
*H04B 1/10* (2006.01)
*H04B 7/216* (2006.01)
*H04J 3/16* (2006.01)

(52) U.S. Cl. ............ 340/10.1; 340/10.2; 340/10.3; 455/67.13; 455/295; 370/320; 370/465

(58) Field of Classification Search .......... 340/10.1, 340/10.3
See application file for complete search history.

(56) References Cited

U.S. PATENT DOCUMENTS

| | | | |
|---|---|---|---|
| 5,649,295 A * | 7/1997 | Shober et al. ............. 340/10.1 |
| 7,649,441 B2 * | 1/2010 | Adamec et al. ............ 340/10.2 |
| 7,710,239 B2 * | 5/2010 | Kranz ....................... 340/10.1 |
| 7,848,770 B2 * | 12/2010 | Scheinert .................. 455/524 |
| 7,911,325 B2 * | 3/2011 | Nagai et al. ............... 340/10.2 |
| 2005/0099270 A1 * | 5/2005 | Diorio et al. .............. 340/10.51 |
| 2006/0261953 A1 * | 11/2006 | Diorio et al. .............. 340/572.2 |
| 2007/0025475 A1 * | 2/2007 | Okunev ..................... 375/343 |
| 2007/0069859 A1 | 3/2007 | Bae et al. |
| 2007/0109129 A1 * | 5/2007 | Sundstrom et al. ........ 340/572.2 |
| 2007/0236335 A1 * | 10/2007 | Aiouaz et al. ............. 340/10.32 |
| 2007/0280369 A1 * | 12/2007 | Reynolds .................. 375/267 |
| 2008/0055091 A1 * | 3/2008 | Song et al. ................ 340/572.5 |
| 2009/0146791 A1 * | 6/2009 | Jantunen et al. ........... 340/10.2 |

FOREIGN PATENT DOCUMENTS

| | | |
|---|---|---|
| JP | 2008-060932 A | 3/2008 |
| KR | 10-2007-0034423 A | 3/2007 |
| KR | 10-2008-0078266 A | 8/2008 |

* cited by examiner

*Primary Examiner* — Daniel Wu
*Assistant Examiner* — Emily C Terrell
(74) *Attorney, Agent, or Firm* — Onello & Mello LLP (57) ABSTRACT

A radio frequency identification (RFID) interrogator for determining a bandwidth of a backscattering signal to be backscattered by an RFID tag and a method of operating the same are provided. The RFID interrogator senses a predetermined frequency band to determine whether the predetermined frequency band has been occupied and determines a sensing result. The RFID interrogator further controls the bandwidth of the backscattering signal in response to the sensing result.

3 Claims, 10 Drawing Sheets

RADIO FREQUENCY IDENTIFICATION INTERROGATOR AND METHOD OF OPERATING THE SAME

CROSS-REFERENCE TO RELATED APPLICATIONS

This application claims priority under 35 U.S.C. §119 to Korean Patent Application No. 10-2009-0007888, filed on Feb. 2, 2009, in the Korean Intellectual Property Office, the contents of which are incorporated herein in its entirety by reference.

BACKGROUND

1. Field

The present inventive concepts relate to a radio frequency identification (RFID) interrogator and a method of operating the same, and more particularly, to an RFID interrogator for automatically setting or changing a bandwidth of a receiving signal from a tag and a method of operating the same.

2. Description of Related Art

Figure 1:
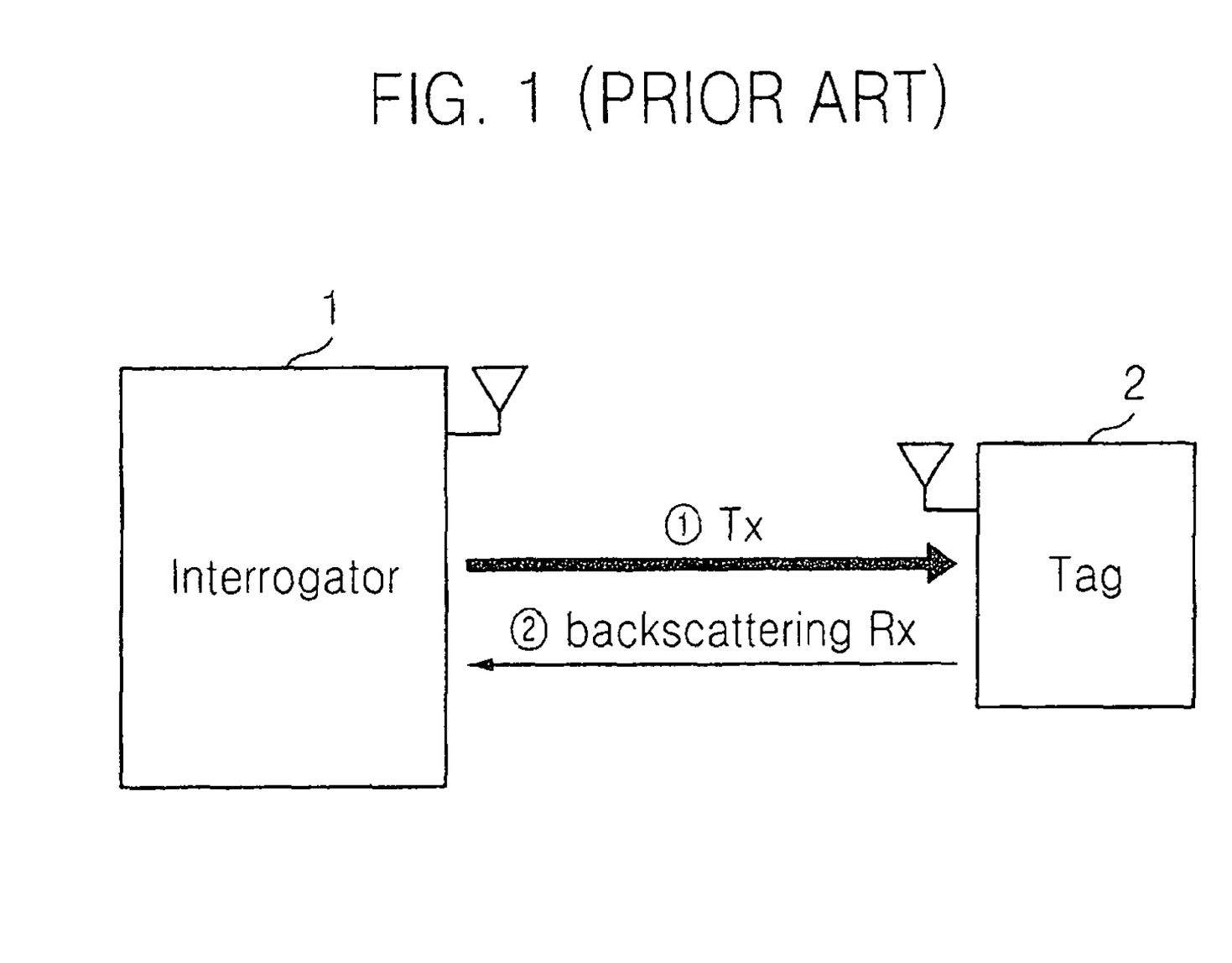
FIG. 1 is a schematic diagram of a conventional radio frequency identification (RFID) system.

FIG. 1 is a schematic diagram of a conventional RFID system. Referring to FIG. 1, the RFID system includes an interrogator (or a reader) 1 and a tag 2. The interrogator 1 reads or writes information stored in the tag 2 using a radio frequency. The interrogator 1 transmits a transmission signal Tx, which is a continuous wave (CW) including a predetermined command, to the tag 2. The tag 2 is provided with power from the transmission signal Tx and backscatters a signal Rx including predetermined information to the interrogator 1.

Figure 2:
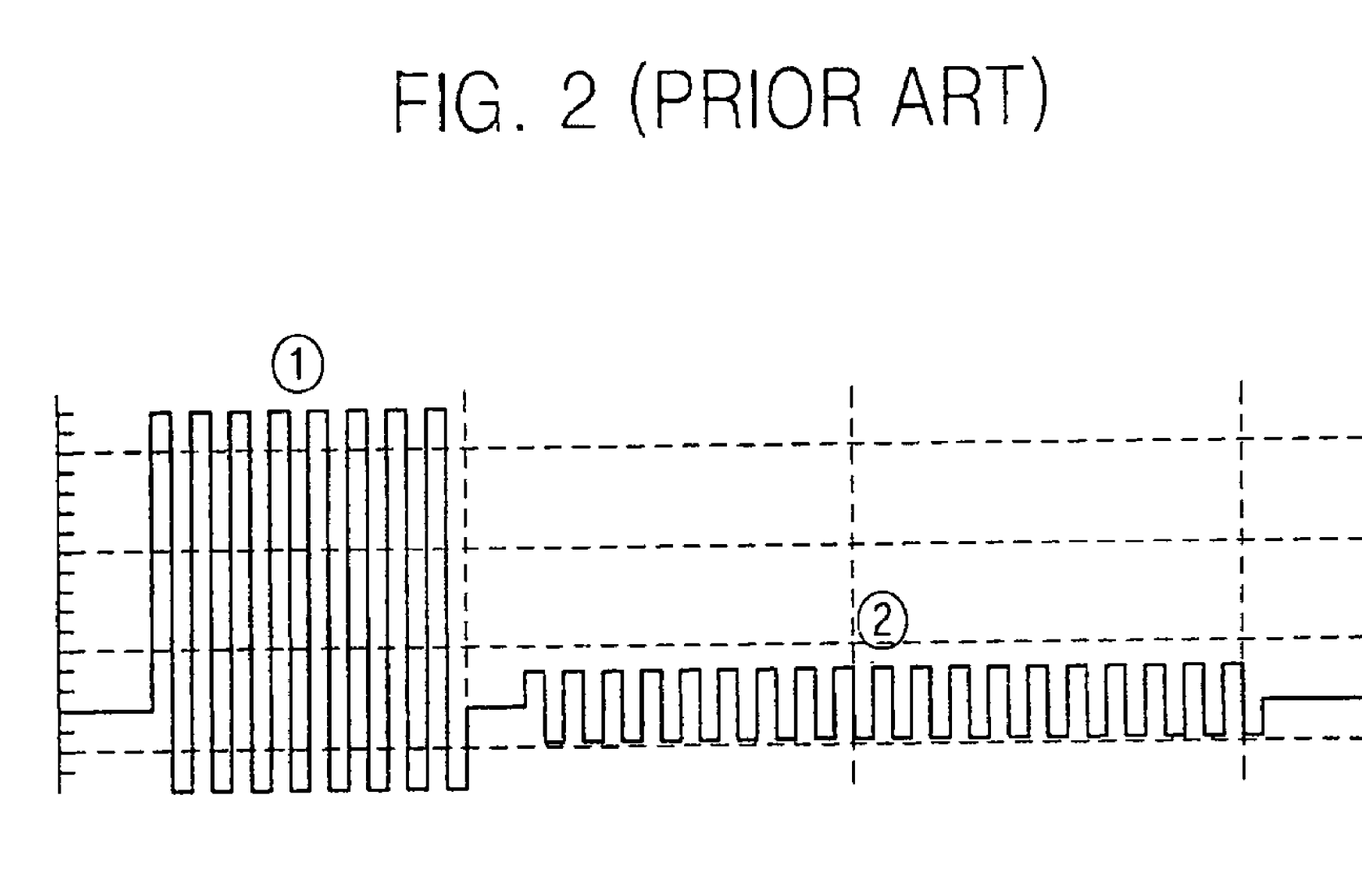
FIG. 2 is a graph showing the power and the bandwidth of signals illustrated in FIG. 1.

FIG. 2 is a graph showing the power and the bandwidth of the signals Tx and Rx illustrated in FIG. 1. Referring to FIGS. 1 and 2, while the transmission signal Tx is provided has high power but narrow bandwidth, the backscattering signal Rx is provided with low power but wide bandwidth.

For such an RFID system including a plurality of interrogators, various regulations have been defined in order to minimize interference between the interrogators and some efforts have been made to reduce channel interference using listen-before-talk (LBT) or hopping technique. However, since the backscattering signal Rx has very low power and hardly affects other wireless devices, such regulations or efforts have been made to reduce interference between transmission signals Tx, but have not addressed the backscattering signal Rx. Moreover, when the bandwidth of the backscattering signal Rx is increased when increasing a data rate, the receiving performance of an interrogator may be reduced due to interference from other devices, even though the interrogator does not affect other interrogators.

For this reason, the backscattering signal Rx conventionally has a fixed bandwidth that is at a state in which maximum interference may occur, regardless of a channel environment.

SUMMARY

To address the above limitations, an RFID interrogator that reduces or minimizes a decrease in reception due to interference and achieves a maximum data rate by adaptively changing the bandwidth of a backscattering signal Rx according to a channel environment in an RFID system and a method of operating the RFID interrogator are desired.

Some embodiments of the present inventive concepts provide a radio frequency identification (RFID) interrogator for automatically determining a bandwidth which allows a maximum receiving data rate to be secured without a decrease in receiving rate due to interference of backscattering signal in an existing channel environment and for controlling a tag to transmit a backscattering signal in the determined bandwidth, and a method of operating the RFID interrogator.

Some embodiments of the present inventive concepts also provide an RFID interrogator for increasing a receiving data rate by sensing the environment of a channel having a bandwidth adjacent to a current bandwidth periodically or at the user's setting, checking whether the current bandwidth of a backscattering signal can be widened, and keeping or widening the current bandwidth based on a check result, and a method of operating the RFID interrogator.

According to some embodiments of the present inventive concepts, there is provided an RFID interrogator for determining a bandwidth of a backscattering signal to be backscattered by an RFID tag. The RFID interrogator senses a predetermined frequency band to determine whether the predetermined frequency band is occupied and determines a sensing result. The RFID interrogator also controls the bandwidth of the backscattering signal in response to the sensing result.

In an embodiment, when the RFID interrogator determines that the predetermined frequency band is occupied, the RFID interrogator controls the bandwidth of the backscattering signal to preclude the predetermined frequency band.

In an embodiment, the RFID interrogator controls the bandwidth of the backscattering signal by changing at least one bandwidth factor of the backscattering signal.

In an embodiment, the bandwidth factor may include at least one between a backscattering link frequency (BLF) and a Miller subcarrier index.

In an embodiment, when the RFID interrogator determines that the predetermined frequency band is not occupied, the RFID interrogator senses a backscattering signal candidate band based on a predetermined value of the BLF and a predetermined value of the Miller subcarrier index. In an embodiment, when the RFID interrogator determines that the backscattering signal candidate band is occupied based on the sensing result, the RFID interrogator may change the value of the BLF until the backscattering signal candidate band is not occupied.

In an embodiment, when the RFID interrogator determines that the predetermined frequency band is occupied, the RFID interrogator senses the backscattering signal candidate band based on the predetermined value of the BLF and the predetermined value of the Miller subcarrier index, and when the RFID interrogator determines that the backscattering signal candidate band is occupied based on the sensing result, the RFID interrogator may increase or decrease at least one between the value of the BLF and the value of the Miller subcarrier index until the backscattering signal candidate band is not occupied.

In an embodiment, the RFID interrogator corrects one of the value of the BLF and the value of the Miller subcarrier index and changes the other one of the value of the BLF and the value of the Miller subcarrier index and senses a backscattering signal candidate band based on the changed value to determine whether it has been occupied, and when all backscattering signal candidate bands corresponding to all available changed values have been occupied, the RFID interrogator adjusts the fixed value.

In an embodiment, The RFID interrogator receives a signal in the predetermined frequency band and determine that the predetermined frequency band has been occupied when the received signal has an amplitude greater than a predetermined value.

According to other embodiments of the present inventive concepts, there is provided an RFID interrogator for determining a bandwidth of a backscattering signal to be backscattered by an RFID tag. The RFID interrogator senses a predetermined frequency band to determine whether the predetermined frequency band is occupied and controls the bandwidth of the backscattering signal to include at least part of the predetermined frequency band or to preclude the predetermined frequency band based on a sensing result.

In an embodiment, the RFID interrogator controls the bandwidth of the backscattering signal by changing at least one bandwidth factor of the backscattering signal.

In an embodiment, the bandwidth factor includes at least one of a backscattering link frequency (BLF) and a Miller subcarrier index.

According to further embodiments of the present inventive concepts, there is provided an RFID interrogator for determining a bandwidth of a backscattering signal to be backscattered by an RFID tag. The RFID interrogator senses a bandwidth adjacent a current bandwidth of the backscattering signal to determine whether the adjacent bandwidth has been occupied based on information about the current bandwidth of the backscattering signal, and maintains or changes the current bandwidth of the backscattering signal based on a sensing result.

In an embodiment, the RFID interrogator periodically senses the adjacent bandwidth to determine whether the adjacent bandwidth is occupied.

In other embodiments, a method of operating an RFID interrogator includes sensing a predetermined frequency band to determine whether it has been occupied and controlling a bandwidth of a backscattering signal to be received from an RFID tag based on a sensing result.

In an embodiment, the controlling the bandwidth of the backscattering signal may include setting bandwidth factors of the backscattering signal to predetermined values, respectively, when it is determined that the predetermined frequency band is not occupied as the sensing result; and changing a value of one of the bandwidth factors repeatedly until a backscattering signal candidate band based on the changed value of the one bandwidth factor is not occupied.

In an embodiment, the controlling the bandwidth of the backscattering signal may further include, when all backscattering signal candidate bands corresponding to all available values of the one bandwidth factor have been occupied, changing a value of another one of the bandwidth factors.

In an embodiment, the sensing the predetermined frequency band may include extracting a signal in the predetermined frequency band from an input signal of the RFID interrogator and determining that the predetermined frequency band has been occupied when the extracted signal has an amplitude greater than a predetermined value.

In an embodiment, the method is performed by a processor of the RFID interrogator that executes a program recorded on a computer readable recording medium.

In yet other embodiments, a method of operating an RFID interrogator includes sensing a predetermined frequency band to determine whether it has been occupied and controlling a bandwidth of a backscattering signal to be received from an RFID tag to include at least part of the predetermined frequency band or to preclude the predetermined frequency band based on a sensing result.

In an embodiment, the method is performed by a processor of the RFID interrogator that executes a program recorded on a computer readable recording medium.

In still other embodiments, a method of operating an RFID interrogator includes sensing a bandwidth adjacent to a current bandwidth of a backscattering signal to determine whether the adjacent bandwidth has been occupied based on information about the current bandwidth of the backscattering signal and maintaining or changing the current bandwidth of the backscattering signal based on a sensing result.

In an embodiment, a program for executing the method of operating the RFID interrogator is recorded in a computer readable recording medium.

In an embodiment, the method is performed by a processor of the RFID interrogator that executes a program recorded on a computer readable recording medium.

BRIEF DESCRIPTION OF THE DRAWINGS

The foregoing and other features and advantages of the inventive concepts will be apparent from the more particular description of preferred embodiments of the inventive concepts, as illustrated in the accompanying drawings in which like reference characters refer to the same parts throughout the different views. The drawings are not necessarily to scale, emphasis instead being placed upon illustrating the principles of the inventive concepts. In the drawings.

DETAILED DESCRIPTION OF THE EMBODIMENTS

The present inventive concepts now will be described more fully hereinafter with reference to the accompanying drawings, in which embodiments are shown. These inventive concepts may, however, be embodied in many different forms and should not be construed as limited to the embodiments set forth herein. Rather, these embodiments are provided so that this disclosure will be thorough and complete, and will fully convey the scope of the inventive concepts to those skilled in the art. In the drawings, the size and relative sizes of layers and regions may be exaggerated for clarity. Like numbers refer to like elements throughout.

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. As used herein, the term "and/or" includes any and all combinations of one or more of the associated listed items and may be abbreviated as "/".

It will be understood that, although the terms first, second, etc. may be used herein to describe various elements, these elements should not be limited by these terms. These terms are only used to distinguish one element from another. For example, a first signal could be termed a second signal, and, similarly, a second signal could be termed a first signal without departing from the teachings of the disclosure.

The terminology used herein is for the purpose of describing particular embodiments only and is not intended to be limiting of the inventive concepts. As used herein, the singular forms "a", "an" and "the" are intended to include the plural forms as well, unless the context clearly indicates otherwise. It will be further understood that the terms "comprises" and/or "comprising," or "includes" and/or "including" when used in this specification, specify the presence of stated features, regions, integers, steps, operations, elements, and/or components, but do not preclude the presence or addition of one or more other features, regions, integers, steps, operations, elements, components, and/or groups thereof.

Unless otherwise defined, all terms, including technical and scientific terms, used herein have the same meaning as commonly understood by one of ordinary skill in the art to which these inventive concepts belong. It will be further understood that terms, such as those defined in commonly used dictionaries, should be interpreted as having a meaning that is consistent with their meaning in the context of the relevant art and/or the present application, and will not be interpreted in an idealized or overly formal sense unless expressly so defined herein.

Figure 3:
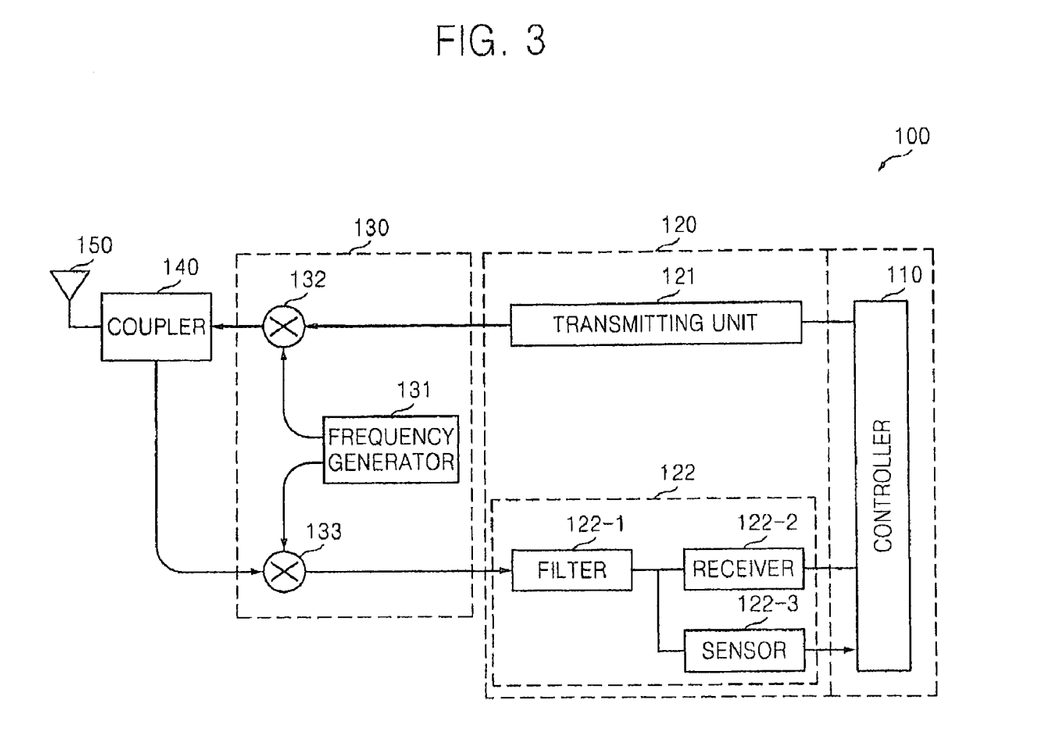
FIG. 3 is a schematic block diagram of an RFID interrogator according to some embodiments of the present inventive concepts.

FIG. 3 is a schematic block diagram of a radio frequency identification (RFID) interrogator 100 according to some embodiments. In an embodiment, the RFID interrogator 100 can be a mobile terminal. The RFID interrogator 100 includes a controller 110, a baseband unit 120, and a front-end unit 130. One or more of these elements of the RFID interrogator can include a processor to perform the functions and operations described herein. The RFID interrogator 100 may also include a coupler 140 and/or an antenna 150.

The RFID interrogator 100 can perform the functions or the operations defined in accordance with the ISO/IEC 18000-6 Type C standard. Since the functions and the operations of the RFID interrogator 100 and the functions and the operations of elements included in the RFID interrogator 100 are disclosed in the ISO/IEC 18000-6 standard, they will be briefly described below.

The controller 110 controls the baseband unit 120. The controller 110 may be referred to as a protocol controller or a processor. The baseband unit 120 includes a transmitting unit 121 and a receiving unit 122. The transmitting unit 121 is controlled by the controller 110 to generate an analog signal corresponding to data and/or a command to be transmitted to an RFID tag. The analog signal is output to the front-end unit 130. The analog signal output from the baseband unit 120 is mixed with a high-frequency signal generated by a frequency generator 131 by a mixer 132 in the front-end unit 130 and then output to the RFID tag, for example, RFID tag 2 shown in FIG. 1, via the coupler 140 and the antenna 150.

A signal provided by the RFID tag, and received through the antenna 150 and the coupler 140, is converted into a baseband signal by a down mixer 133 and then output to the receiving unit 122. The receiving unit 122 includes a filter 122-1, a receiver 122-2, and a sensor 122-3. The filter 122-1 filters the signal input to the receiving unit 122 to output the signal at a predetermined frequency band to the receiver 122-2 and/or the sensor 122-3. In an embodiment, the filter 122-1 can include a band-pass filter.

The receiver 122-2 decodes the analog signal output from the filter 122-1 into a digital signal and outputs the digital signal to the controller 110. The sensor 122-3 determines whether the frequency band selected by the filter 122-1 is or has been occupied by other devices (e.g., other interrogators) or specified noise. Hereinafter, when the predetermined frequency band is determined by the sensor 122-3 as having been occupied, the predetermined frequency band may not be used by the RFID interrogator 100 receiving a backscattering signal from an RFID tag. Thus, the RFID interrogator 100 can control an RFID tag by prohibiting the RFID tag from transmitting a backscattering signal in an occupied frequency band. For instance, when the predetermined frequency band has been occupied, a signal having at least a predetermined amplitude may exist in the predetermined frequency band due to noise or other devices or channel environments. The sensor 122-3 may be implemented by a received signal strength indicator (RSSI), but the present inventive concepts are not restricted thereto and may use various modifications known to those of ordinary skill in the art. In an embodiment, the controller 110 determines whether the predetermined frequency band has been or is currently occupied based on information output from the sensor 122-3.

As disclosed in the ISO/IEC 18000-6 Type C standard, the bandwidth of a backscattering signal transmitted from the RFID tag may be determined by a command included in a transmitting signal from the RFID interrogator 100 to the RFID tag. In addition, the bandwidth of the backscattering signal may be determined by bandwidth factors. In an embodiment, the bandwidth factors may include any factors that affect the bandwidth of the backscattering signal. According to the ISO/IEC 18000-6 Type C standard, the bandwidth factors include a backscattering link frequency (BLF) and a Miller subcarrier index M, for example, described herein.

In other embodiments, if the bandwidth of the backscattering signal can be determined according to other standards or methods, the bandwidth factors can include other factors in addition to, or instead of, the BLF and the Miller subcarrier index M. Hereinafter, for clarity of the description, a case where the bandwidth of the backscattering signal is determined by the BLF and the Miller subcarrier index M, as is disclosed in the ISO/IEC 18000-6 Type C standard, will be described as an example.

The bandwidth of the backscattering signal is proportional to BLF/M. Accordingly, when the RFID interrogator 100 determines the BLF and the Miller subcarrier index M and transmits a command including information on the determined BLF and Miller subcarrier index M to an RFID tag, the RFID tag outputs the backscattering signal in a bandwidth corresponding to the BLF and the Miller subcarrier index M. Consequently, the RFID interrogator 100 can control the bandwidth of the backscattering signal output from the RFID tag.

As described above, the RFID interrogator 100 determines whether a predetermined frequency band has been occupied and changes the bandwidth of a backscattering signal based on a result of this determination. The RFID interrogator 100 can set the bandwidth of the backscattering signal before identifying an RFID tag. The RFID interrogator 100 can filter an input signal to extract signals in a predetermined frequency band and determine whether the predetermined frequency band has been occupied based on the intensity of the filtered signal, without emitting a special signal.

Figure 4:
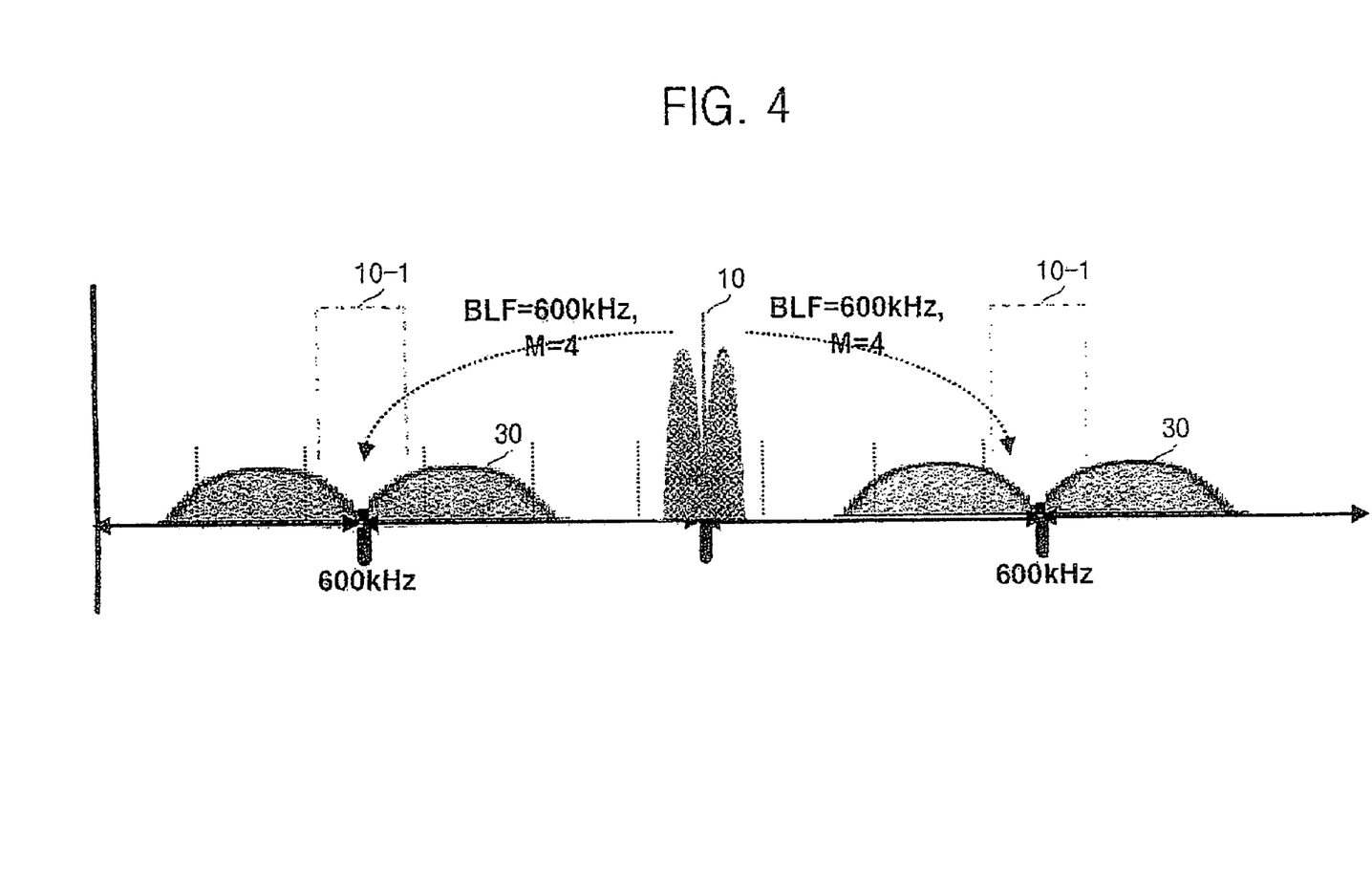
FIGS. 4 and 5 are diagrams illustrating a method of controlling a bandwidth of a backscattered signal according to some embodiments of the present inventive concepts.
Figure 5:
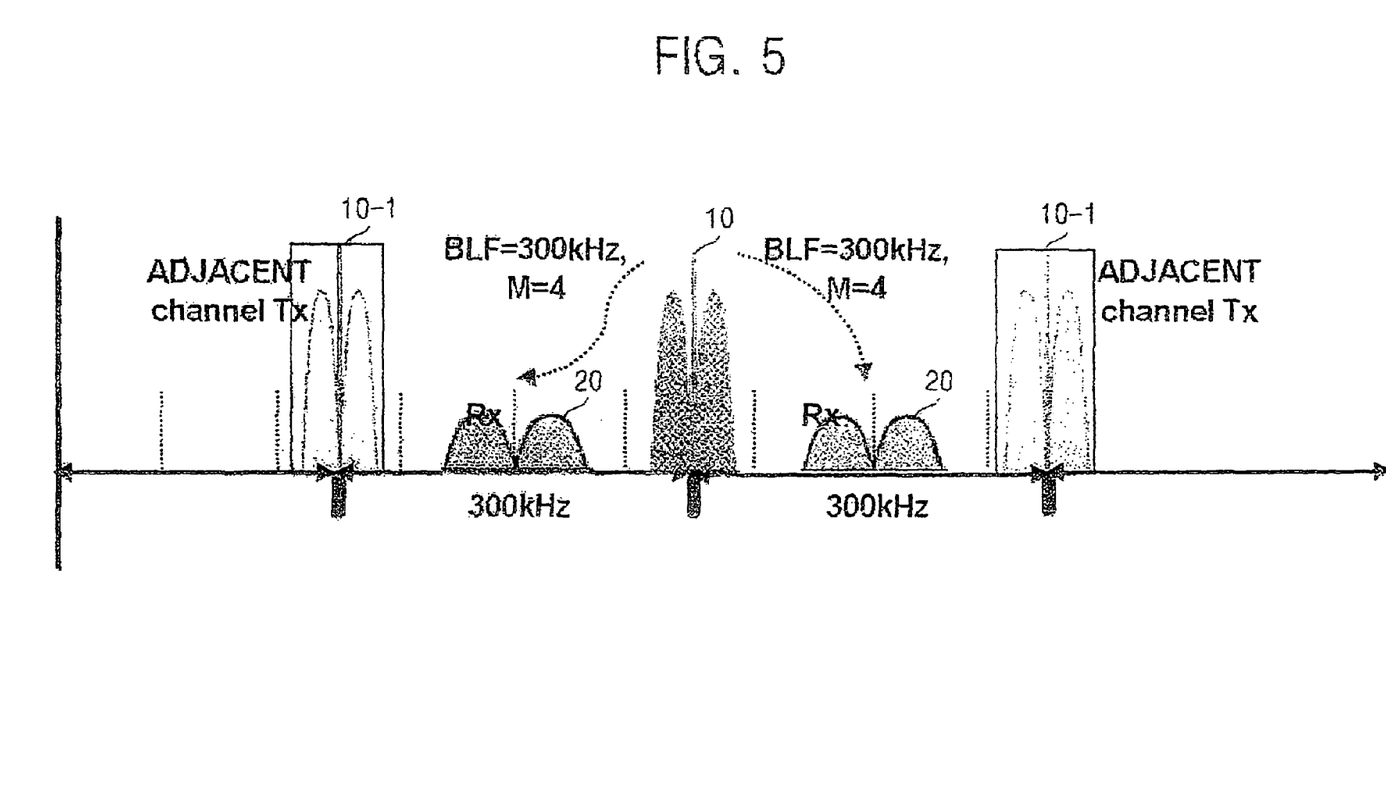

FIGS. 4 and 5 are diagrams illustrating a method of controlling a bandwidth of a backscattered signal according to some embodiments. In FIGS. 4 and 5, the x-axis refers to a frequency band and the y-axis refers to the amplitude of a signal. Referring to the embodiments of FIGS. 3 through 5, the RFID interrogator 100 can change the bandwidth of the backscattering signal by adjusting a BLF. However, in other embodiments, other bandwidth factors known to those of ordinary skill can be adjusted to changed the bandwidth of the backscattering signal.

FIG. 4 shows the frequency band of a transmitting signal Tx 10 and the frequency band of a backscattering signal Rx 30. When channels 10-1 adjacent to channel used by the transmitting signal 10 are not occupied, the backscattering signal 30 has signal characteristics determined by BLF=600 kHz and M=4. At this time, the backscattering signal 30 has signal characteristics illustrated in FIG. 4.

However, when the adjacent channels 10-1 are occupied by transmitting signals Tx of other devices (e.g., other interrogators) as illustrated in FIG. 5, a receiving rate of the backscattering signal 30 having the characteristics illustrated in FIG. 4 is decreased due to interference of the other devices' transmitting signals Tx. In this case, the RFID interrogator 100 decreases the BLF as illustrated in FIG. 5, thereby decreasing a bandwidth of the backscattering signal 30 to a bandwidth of a backscattering signal 20. For example, FIG. 5 illustrates a case where the BLF is decreased from 600 kHz to 300 kHz. The decrease in the BLF when the adjacent channels 10-1 are occupied may be different depending on a difference in bandwidth between channels. Information about how much the BLF is decreased or increased may be stored in advance in the RFID interrogator 100.

When the adjacent channels 10-1 stop being occupied while an RFID tag is transmitting the backscattering signal 20 having characteristics illustrated in FIG. 5, the RFID interrogator 100 may adjust a bandwidth factor, i.e., the BLF, to the signal characteristics illustrated in FIG. 4, for example, 600 kHz shown in FIG. 4. Meanwhile, the bandwidth of a backscattering signal Rx may be changed by other bandwidth factors, for example, a Miller subcarrier index M, other than the BLF.

Figure 6:
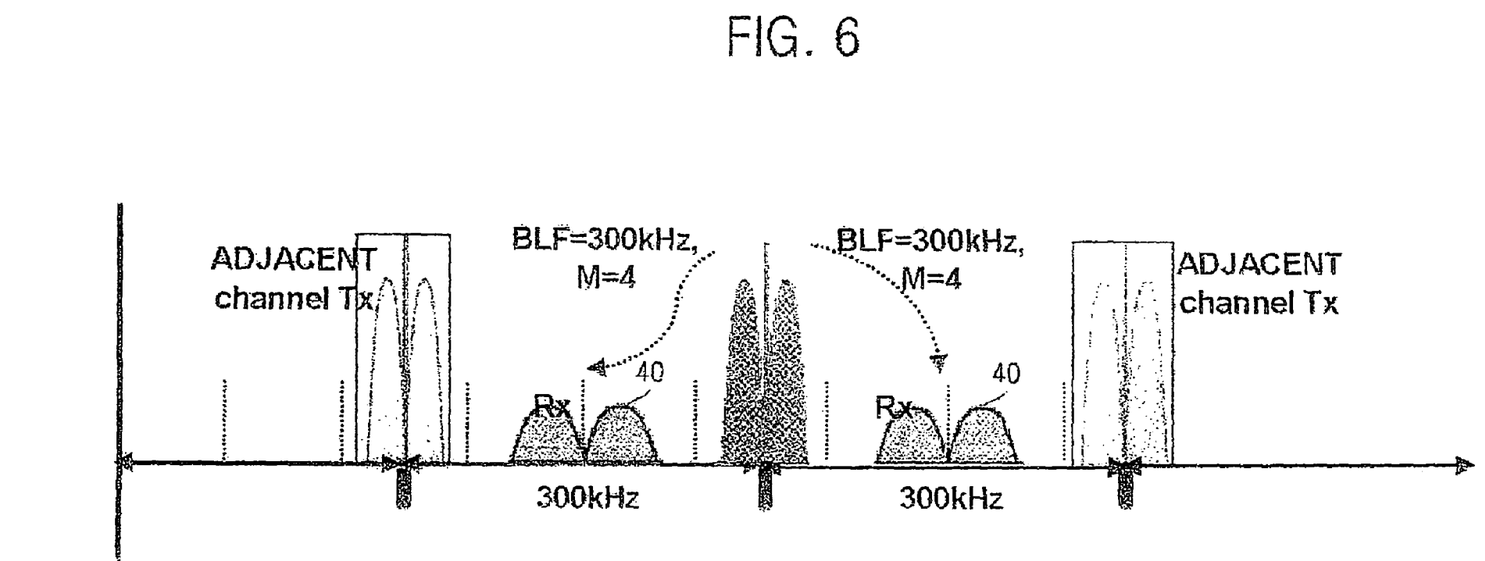
FIGS. 6 through 8 are diagrams for explaining a method of controlling a bandwidth of a backscattered signal according to other embodiments of the present inventive concepts.
Figure 7:
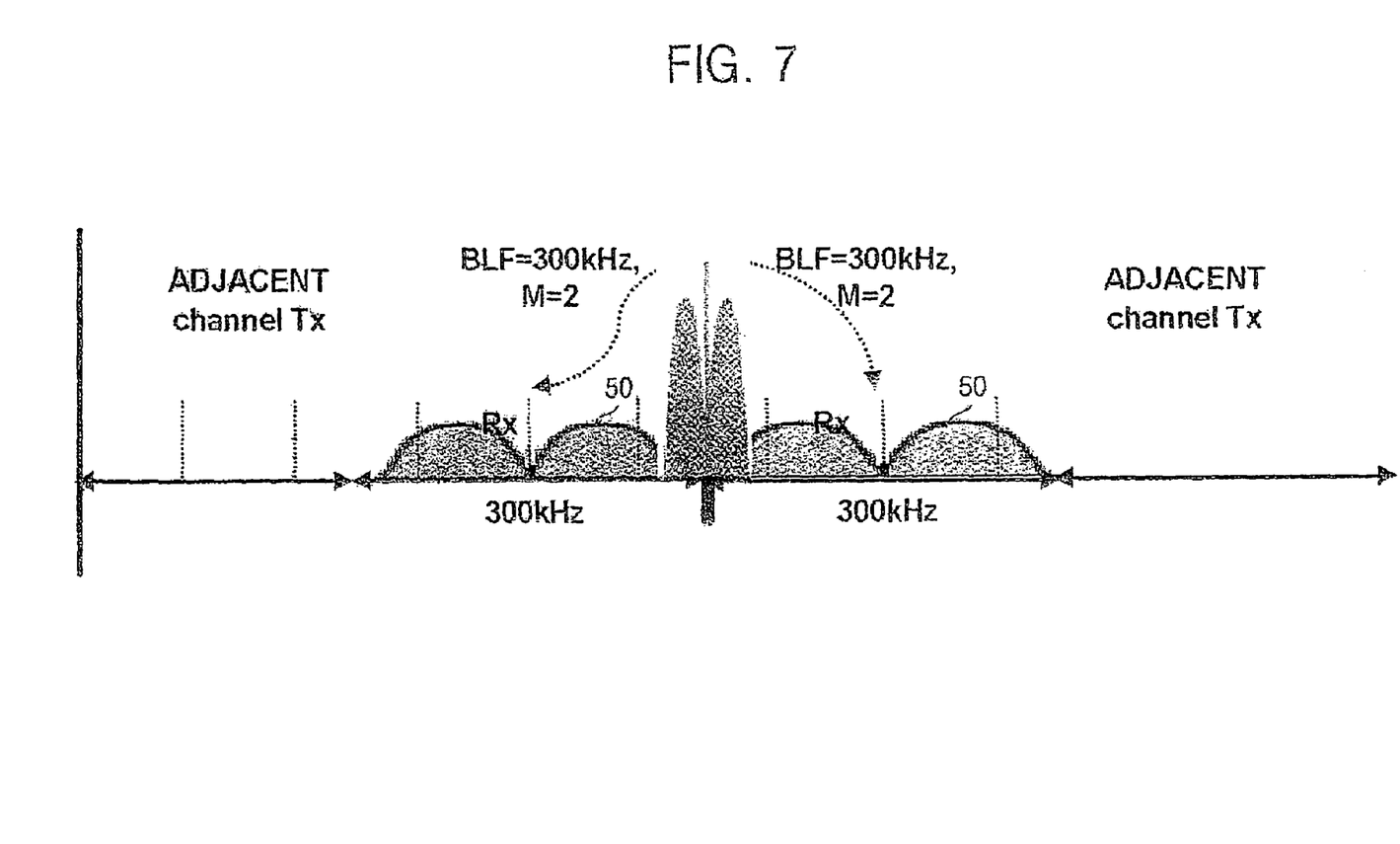
Figure 8:
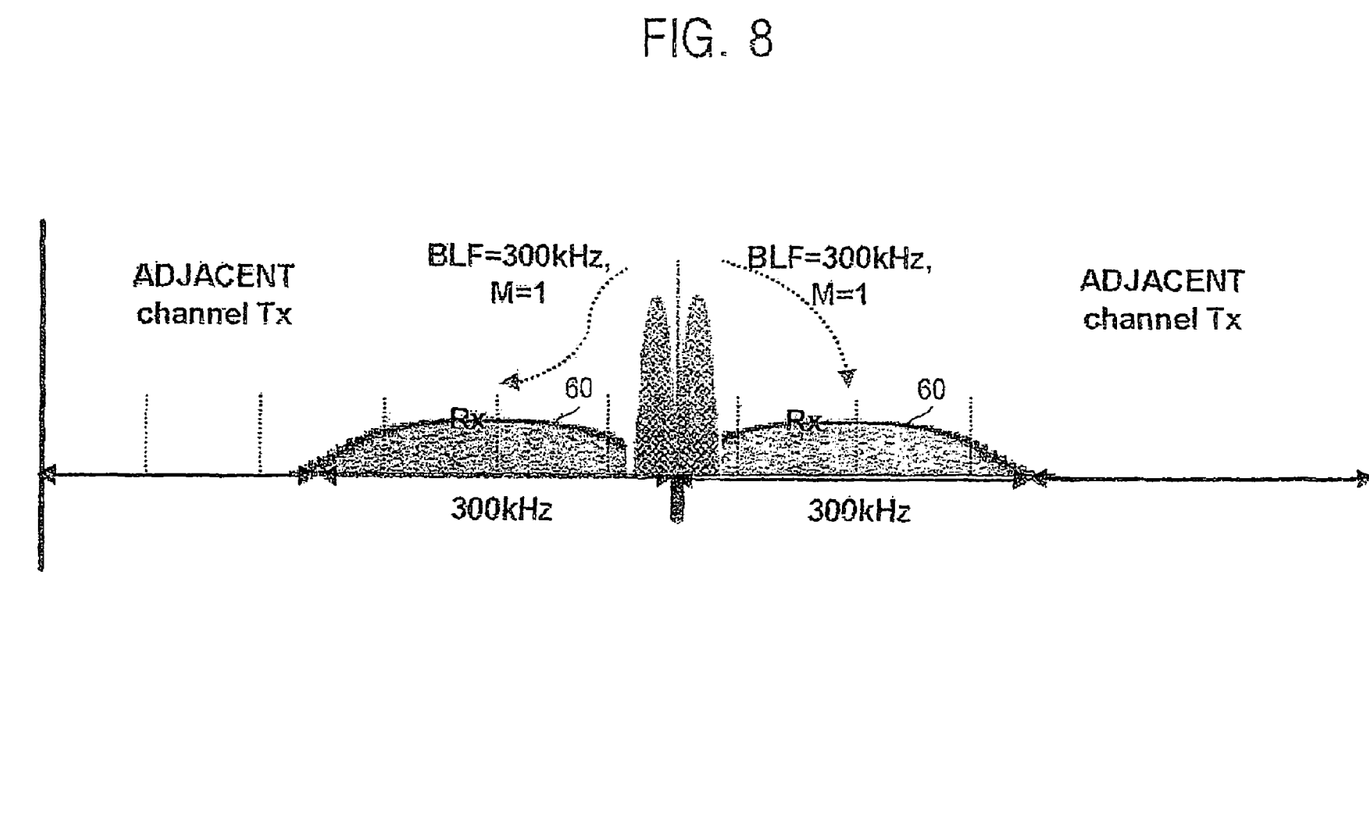

FIGS. 6 through 8 show a case where the bandwidth of the backscattering signal Rx is changed by the Miller subcarrier index M. In particular, FIGS. 6 through 8 are diagrams for explaining a method of controlling a bandwidth of a backscattered signal according to other embodiments. When channels adjacent a channel used by a transmitting signal of the RFID interrogator 100 are occupied, a backscattering signal 40 may have bandwidth factors BLF=300 kHz and M=4, as illustrated in FIG. 6.

Thereafter, when the adjacent channels are not occupied as illustrated in FIG. 7, the RFID interrogator 100 can increase a data rate by increasing the bandwidth of the backscattering signal 40. At this time, the RFID interrogator 100 may increase the bandwidth by decreasing the Miller subcarrier index M, for example, to M=2. The backscattering signal with an increased bandwidth may be similar to a backscattering signal 50 shown in FIG. 7. FIG. 8 shows a transmitting signal and a backscattering signal 60 when the Miller subcarrier index M is 1. When M=1, a backscattering signal is encoded using FM0 encoding, as is disclosed in the ISO/IEC 18000-6 Type C standard.

Figure 9:
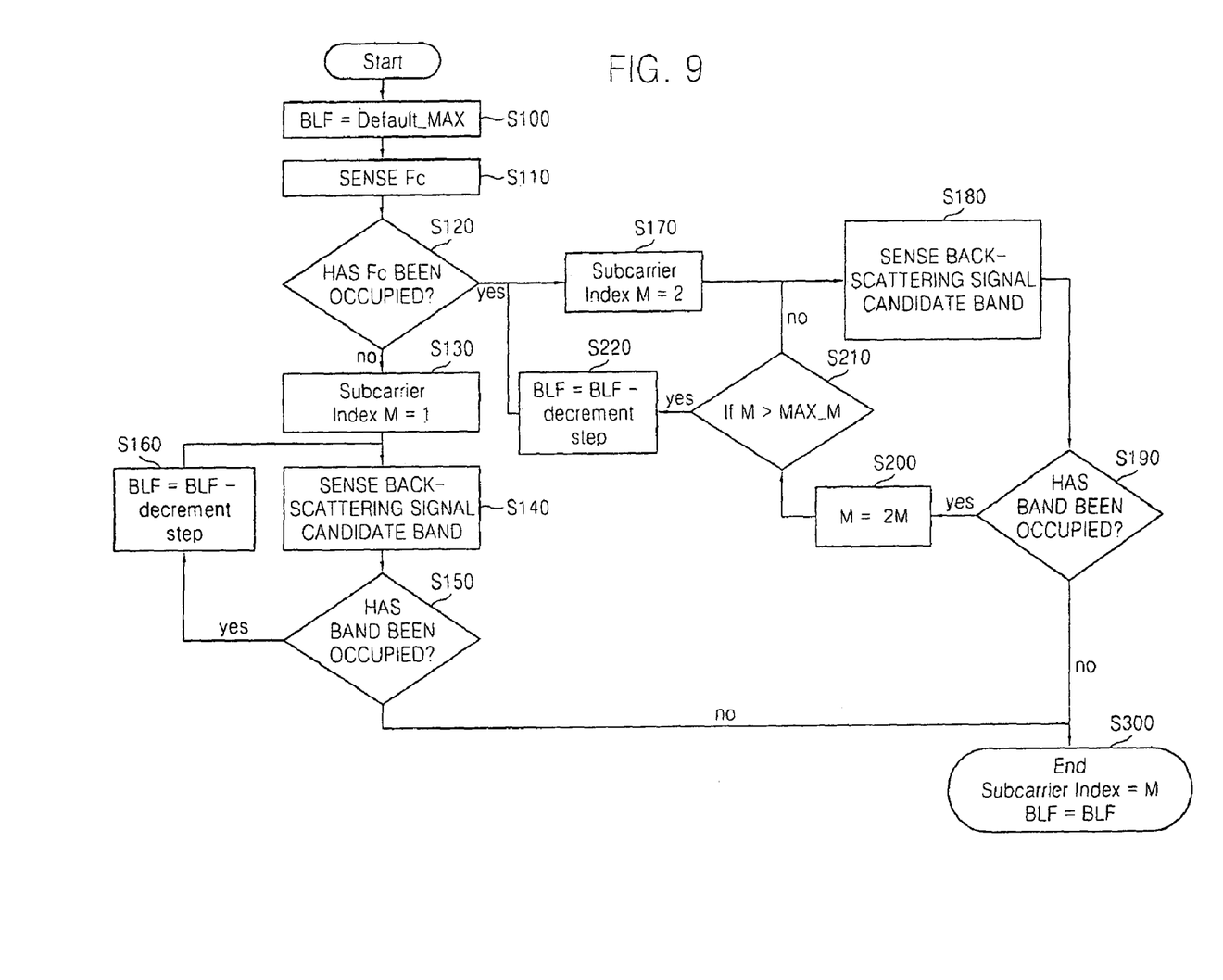
FIG. 9 is a flowchart of a method of determining bandwidth factors using an RFID interrogator according to some embodiments of the present inventive concepts.

FIG. 9 is a flowchart of a method of determining bandwidth factors using an RFID interrogator, for example, RFID interrogator 100 shown in FIG. 3, according to some embodiments. In operation S100, the RFID interrogator 100 sets a BLF to an available maximum value Default_MAX. The maximum value Default_MAX may vary with the regulation of channel environment and/or the receiving sensitivity of the RFID interrogator 100. In operation S110, the RFID interrogator 100 senses a frequency band Fc to be used to transmit its transmitting signal. When it is determined that the frequency band Fc is not occupied in operation S120, the RFID interrogator 100 sets a Miller subcarrier index M to 1, as shown in operation S130. When it is determined that the frequency band Fc has been occupied in operation S120, the RFID interrogator 100 may set the Miller subcarrier index M to at least 2 and initially sets the Miller subcarrier index M to 2, as shown in operation S170.

Accordingly, the RFID interrogator 100 repeats determining bandwidth factors such that a bandwidth for a backscattering signal can be as wide as possible and also perform repeated sensing, thereby gradually decreasing the bandwidth for the backscattering signal. However, the method illustrated in FIG. 9 is an example. In an embodiment, contrary to the method illustrated in FIG. 9, a method of gradually increasing a bandwidth for a backscattering signal can be performed by repeating determining bandwidth factors such that the bandwidth for the backscattering signal is as narrow as possible and sensing may also be performed.

In detail, after setting the Miller subcarrier index M to 1, the RFID interrogator 100 may control the bandwidth for the backscattering signal by changing the BLF. First, the RFID interrogator 100 performs a sensing step in operation S140 in order to determine whether a frequency band, hereinafter referred to as a backscattering signal candidate band), determined by the currently set bandwidth factors for the backscattering signal, has been occupied. When M=1, the backscattering signal transmitted using FM0 encoding may have a frequency band ranging from Fc−BLF*2 to Fc+BLF*2.

When it is determined that the backscattering signal candidate band has been occupied in operation S150, the RFID interrogator 100 decreases the BLF by a decrement step in operation S160. Available values for the BLF may be predetermined and the decrement step may be the same or different in each decreasing operation. The RFID interrogator 100 decreases the BLF step by step until the backscattering signal candidate band is not occupied, thereby decreasing the bandwidth for the backscattering signal. When it is determined that the backscattering signal candidate band is not occupied as a result of the sensing in operation 5150, a current value of the BLF and the value, i.e., 1 of the Miller subcarrier index M are determined as values of the bandwidth factors of the backscattering signal in operation S300. Information about the determined bandwidth factors is included in the transmitting signal transmitted to an RFID tag. The RFID tag receiving the transmitting signal including the information about the bandwidth factors outputs the backscattering signal in a bandwidth corresponding to the information.

Meanwhile, when it is determined that the frequency band Fc of the transmitting signal has been occupied in operation S120, the RFID interrogator 100 may control the RFID tag to perform Miller encoding by setting the Miller subcarrier index M to at least 2. When the RFID tag performs the Miller encoding, the backscattering signal may have a frequency band ranging from Fc−BLF*(1−2/M) to Fc−BLF*(1+2/M) and a frequency band ranging from Fc+BLF*(1−2/M) to Fc+BLF*(1+2/M). Accordingly, the backscattering signal candidate band may be Fc−BLF*(1−2/M) through Fc−BLF*(1+2/M) and Fc+BLF*(1−2/M) through Fc+BLF*(1+2/M).

Then, the RFID interrogator 100 may adjust the BLF to a fixed current value and gradually decrease the bandwidth for the backscattering signal by increasing the Miller subcarrier index M. In the embodiments illustrated in FIG. 9, when the Miller encoding is used, the Miller subcarrier index M is changed with the BLF fixed and, when all backscattering signal candidate bands corresponding to all available values of the Miller subcarrier index M have been occupied, the BLF is then changed. Consequently, the scope of the present inventive concepts includes any ideas that at least one of bandwidth factors of the backscattering signal is fixed and backscattering signal candidate bands are sensed to find out whether they have been occupied while other bandwidth factors are being changed.

First, in operation S170, the RFID interrogator 100 sets the Miller subcarrier index M to 2 to set the Miller subcarrier index M to a minimum value in the Miller encoding. Thereafter, in operation S180, the RFID interrogator 100 senses a backscattering signal candidate band determined by the current values of the bandwidth factors. When it is determined that the backscattering signal candidate band has been occupied as a result of the sensing in operation S190, the RFID interrogator 100 increases the Miller subcarrier index M in operation S200. Since the Miller subcarrier index M has a value of 2, 4, 8 or the like in Miller encoding, the RFID interrogator 100 sets the Miller subcarrier index M to a new value that is twice the current value in operation S200.

When it is determined that the new value of the Miller subcarrier index M is greater than an available maximum value MAX_M in operation S210, the RFID interrogator 100 decreases a value of another bandwidth factor, i.e., the BLF, by a decrement step in operation S220. Thereafter, the RFID interrogator 100 resets the Miller subcarrier index M to the minimum value of 2 in operation S170 and repeats operations S180 through S210. When it is determined that the new value of the Miller subcarrier index M is not greater than the maximum value MAX_M in operation S210, a backscattering signal candidate band based on the new value of the Miller subcarrier index M is sensed in operation S180 and then operations S190 through S210 are repeated. When it is determined that the backscattering signal candidate band is not occupied in operation S190, the current values of the bandwidth factors, i.e., BLF and Miller subcarrier index M, are determined as values of bandwidth factors for the backscattering signal.

The RFID interrogator 100 may receive information from the RFID tag in a frequency band which has been determined for the backscattering signal using the method illustrated in FIG. 9. Thereafter, when a channel environment is changed, the RFID interrogator 100 may re-control the frequency band and the band width of the backscattering signal using the method illustrated in FIG. 9. However, the bandwidth of the backscattering signal may be changed using a simpler method than the method illustrated in FIG. 9 in which the bandwidth for the backscattering signal is set to a maximum and then decreased while sensing is repeated.

Figure 10:
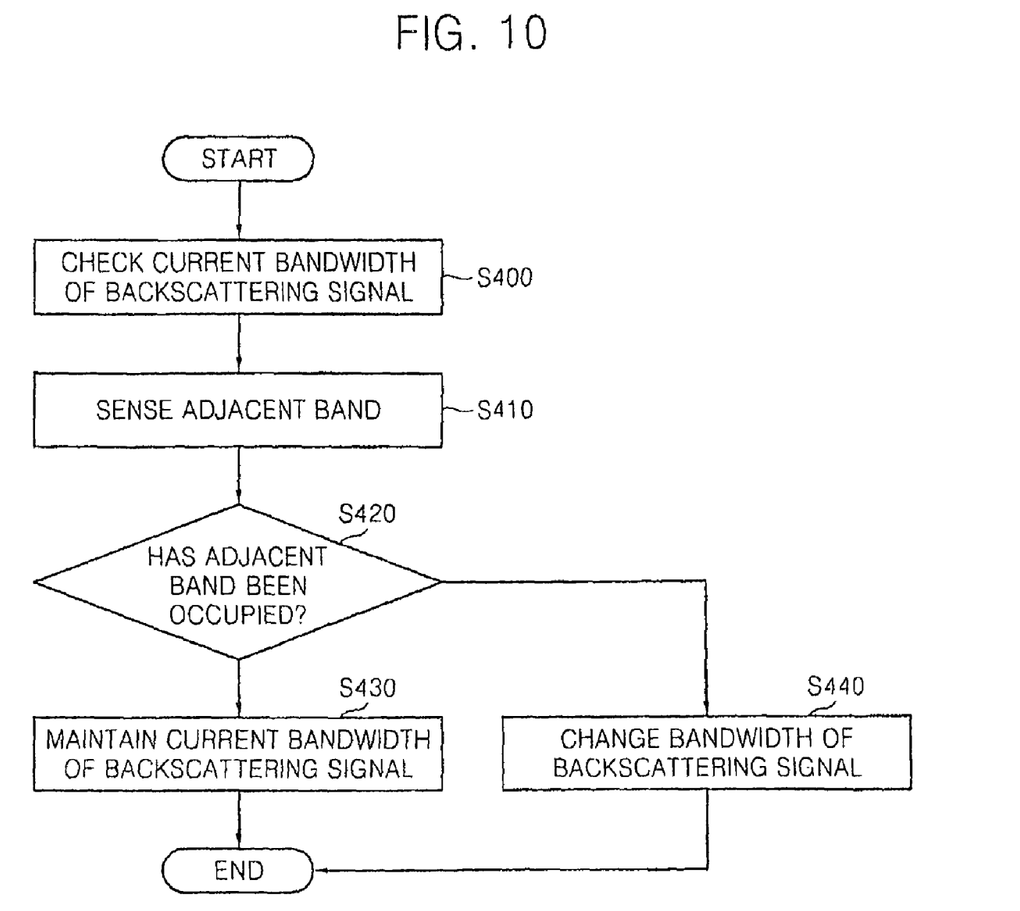
FIG. 10 is a flowchart of a method of determining a bandwidth factor using an RFID interrogator according to other embodiments of the present inventive concepts.

FIG. 10 is a flowchart of a method of determining a bandwidth factor using the
RFID interrogator 100 according to other embodiments. Referring to FIG. 10, in operation S400, the RFID interrogator 100 checks a current bandwidth of a backscattering signal. Since the current bandwidth of the backscattering signal has been determined by the RFID interrogator 100, the RFID interrogator 100 can easily check the current bandwidth of the backscattering signal. Next, in operation S410, the RFID interrogator 100 senses an adjacent channel or frequency band based on the current bandwidth of the backscattering signal. The RFID interrogator 100 may recognize information about the frequency band or channel adjacent to the current bandwidth of the backscattering signal by using channel environment information stored in advance in the RFID interrogator 100 or by performing a predetermined operation in real-time.

When it is determined that the adjacent frequency band has been occupied in operation S420, the RFID interrogator 100 maintains the current bandwidth of the backscattering signal in operation S430. When it is determined that the adjacent frequency band is not occupied in operation S420, since the bandwidth of the backscattering signal can be widened, the RFID interrogator 100 changes a bandwidth factor of the backscattering signal in operation S440. The bandwidth factor may be changed using the method illustrated in FIG. 9 or other methods known to those of ordinary skill in the art.

According to some embodiments, after a frequency band actually used or not used in a channel environment of an RFID system is checked, a bandwidth of a backscattering signal is set, so that the backscattering signal is transmitted in a band in which the backscattering signal is received at an available maximum data rate without interference from other signals, e.g., signals of other devices or noise. In addition, an environment of a band or channel adjacent to a current bandwidth of the backscattering signal is sensed and the bandwidth of the backscattering signal is controlled adaptively to the sensed environment, so that a receiving data rate is increased.

In some embodiments, the features, functions, and operations described herein can be embodied in software, hardware, firmware, or some combination thereof. For example, a method of operating an RFID interrogator according to some embodiments can also be embodied as computer readable codes on a computer readable recording medium, and executable by at least one processor, thereby forming a system specifically adapted to perform functions and operations described herein. The computer readable recording medium is any data storage device that can store data which can be thereafter read by a computer system. Examples of the computer readable recording medium include read-only memory (ROM), random-access memory (RAM), CD-ROMs, magnetic tapes, hard disks, floppy disks, and optical data storage devices. The computer readable recording medium can also be distributed over network coupled computer systems so that the computer readable code is stored and executed in a distributed fashion. Also, functional programs, codes, and code segments for accomplishing the present inventive concepts can be easily construed by programmers skilled in the art to which the present inventive concepts pertain.

While the present inventive concepts have been particularly shown and described with reference to exemplary embodiments thereof, it will be understood by those of ordinary skill in the art that various changes in forms and details may be made therein without departing from the spirit and scope of the present inventive concepts as defined by the following claims.

What is claimed is:

1. A radio frequency identification (RFID) interrogator for determining a bandwidth of a backscattering signal to be backscattered by an RFID tag, the RFID interrogator sensing a predetermined frequency band to determine whether the predetermined frequency band is occupied and determining a sensing result, and the RFID interrogator controlling the bandwidth of the backscattering signal in response to the sensing result, wherein the RFID interrogator controls the bandwidth of the backscattering signal by changing at least one bandwidth factor of the backscattering signal, wherein the bandwidth factor comprises at least one of a backscattering link frequency (BLF) and a Miller subcarrier index, wherein when the RFID interrogator determines that the predetermined frequency band is not occupied, the RFID interrogator senses a backscattering signal candidate band based on a predetermined value of the BLF and a predetermined value of the Miller subcarrier index, and wherein when the RFID interrogator determines that the backscattering signal candidate band is occupied based on the sensing result, the RFID interrogator changes the value of the BLF until the backscattering signal candidate band is not occupied, wherein when the RFID interrogator determines that the predetermined frequency band is occupied, the RFID interrogator senses the backscattering signal candidate band based on the predetermined value of the BLF and the predetermined value of the Miller subcarrier index, and wherein when the RFID interrogator determines that the backscattering signal candidate band is occupied based on the sensing result, the RFID interrogator increases or decreases at least one between the value of the BLF and the value of the Miller subcarrier index until the backscattering signal candidate band is not occupied, and wherein the RFID interrogator corrects one of the value of the BLF and the value of the Miller subcarrier index and changes the other one of the value of the BLF and the value of the Miller subcarrier index and senses a backscattering signal candidate band based on the changed value to determine whether it has been occupied, and wherein when all backscattering signal candidate bands corresponding to all available changed values have been occupied, the RFID interrogator adjusts the fixed value.

2. The RFID interrogator of claim 1, wherein when the RFID interrogator determines that the predetermined frequency band is occupied, the RFID interrogator controls the bandwidth of the backscattering signal to preclude the predetermined frequency band.

3. The RFID interrogator of claim 1, wherein the RFID interrogator receives a signal in the predetermined frequency band and determines that the predetermined frequency band has been occupied when the received signal has an amplitude greater than a predetermined value.

* * * * *